June 17, 1969  A. W. DAVIS  3,450,103
AUTOMATIC POULTRY DRINKER
Filed Aug. 18, 1967  Sheet 1 of 4
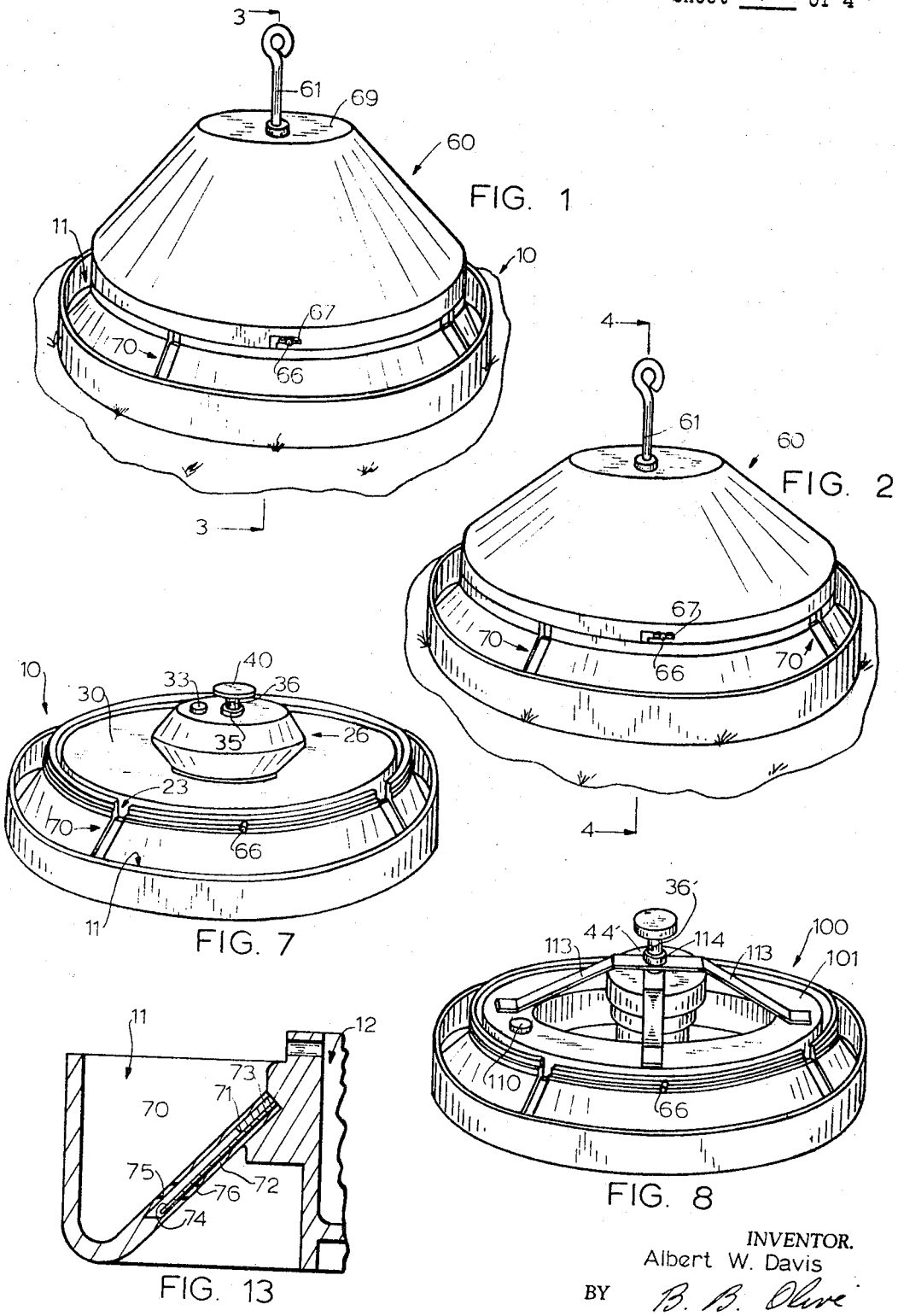
INVENTOR.
Albert W. Davis
BY B. B. Olive
ATTORNEY

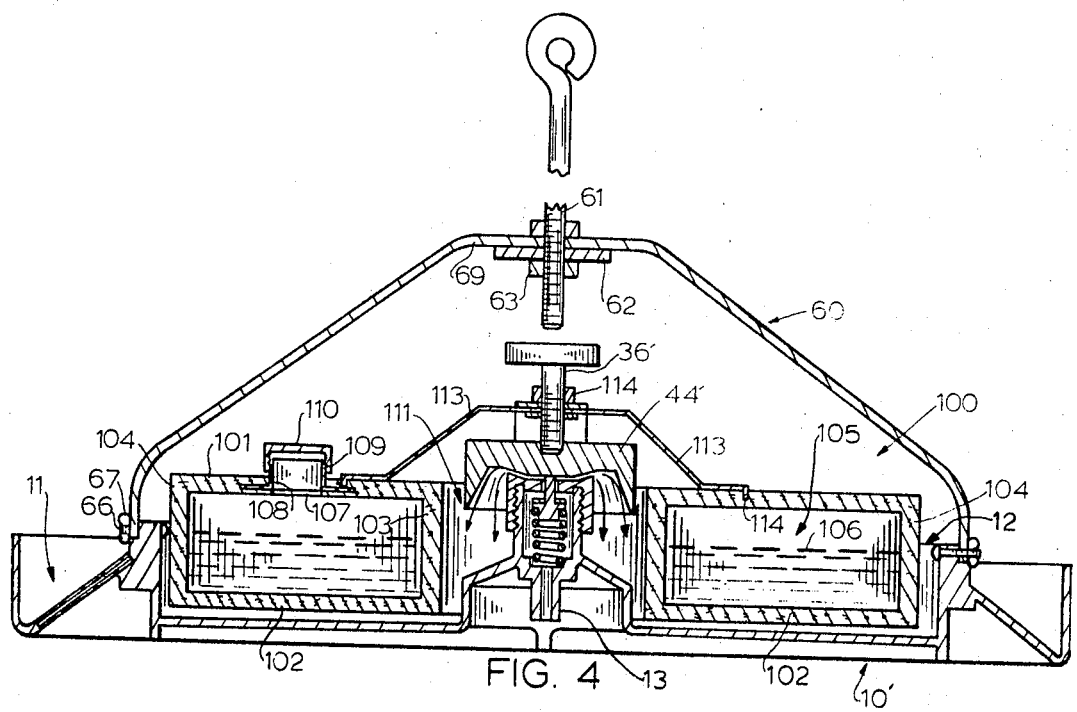
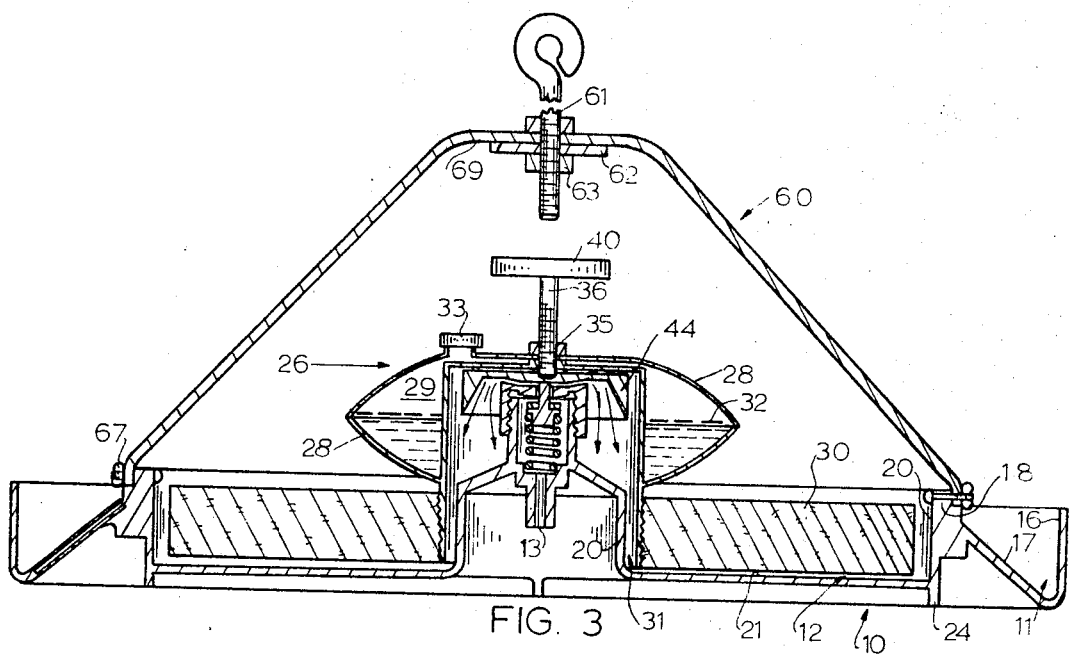

INVENTOR.
Albert W. Davis
BY
*B. B. Olive*

ATTORNEY

June 17, 1969     A. W. DAVIS     3,450,103
AUTOMATIC POULTRY DRINKER
Filed Aug. 18, 1967

INVENTOR.
Albert W. Davis
BY
ATTORNEY

United States Patent Office 3,450,103
Patented June 17, 1969

3,450,103
AUTOMATIC POULTRY DRINKER
Albert W. Davis, Bonlee, N.C., assignor to Poly-Matic Fountain, Inc., Siler City, N.C., a corporation of North Carolina
Filed Aug. 18, 1967, Ser. No. 661,650
Int. Cl. A01k 39/02; F16k 31/22
U.S. Cl. 119—80
10 Claims

ABSTRACT OF THE DISCLOSURE

A poultry drinker utilizes a float controlled valve to maintain a predetermined level of drinking water and which automatically closes when the drinker is tilted. Both the valve and float are loaded by a hollow, liquid filled member whose adjustable position controls the drinking water depth and whose liquid provides a sloshing effect which produces positive valve responses when the drinker is tilted.

CROSS REFERENCE TO RELATED APPLICATION

The present invention relates to an application having the title, Automatic Poultry Drinker, Ser. No. 653,757 filed by me and Burton P. Franklin on July 17, 1967. The present invention and the subject copending application are related in that both applications employ a common type of valve mechanism and water receptacle.

BACKGROUND OF THE INVENTION

Field of the invention

The present invention relates generally to the supplying of water to poultry or like animals and, more particularly, to the intermittent and automatic provision of fresh water to chickens as they grow from small chicks to large sized birds. Devices of this type are generally classified under Animal Husbandry and more specifically under Fountains and Troughs and Flow Control Supply Means.

Description of prior art

In order to raise poultry on a commercial scale, various production techniques must be followed in the feeding, watering and general care of the fowl. It is quite common in the raising of broilers, for example, to have buildings which house 10,000 birds and upward. The birds are brought into the house when a day old and remain together throughout their growing period which may range from 8 to 12 weeks of age. In the raising of poultry on such a large scale and on the "all-in all-out" method, it is necessary to minimize manual labor and to this end, automatic feeding and watering devices are now widely employed. The automatic watering devices of the prior art are generally comprised of a complex spring-valve mechanism which may or may not include a float. While valve arrangements of this type are satisfactory for some uses, they inherently have the disadvantages of being too costly, being dependent on a particular water pressure, overflowing when placed on uneven surfaces or when tilted if suspended, being difficult to clean, being practically impossible to dismantle and to be reassembled in a relatively short period of time for repair purposes and being adapted to service chicken or fowl of only one size.

A representative prior art patent is No. 3,079,892 to Lowery which teaches the combination of a float and a pivot arm which seals the water inlet upon the upward movement of the pivot arm. This apparatus is encased in a bell-shaped structure and has an outlet which leads to a circular trough area. While the valve mechanism therein is relatively simple, it is gauged to handle only a pressure of a particular force and if the pressure is changed, the water in the inlet forces the float downwardly and allows the water to escape outside of the trough area and onto the floor. Further, if the trough is initially placed on an uneven surface which is most likely to be the rule and not the exception, the float will have a tendency either to be below its normal cutoff position thus allowing excess water to run into the trough area and spill onto the floor or to seat too firmly against the water inlet and prevent any water from entering the system. Also, the level of water in the trough cannot be varied due to the static positioning of the pivot member and water inlet in the housing. This patent is typical of what may be found in the art for it solves some of the problems with which the art is faced while leaving open other problems. Other prior art references may solve problems not solved by Lowery but may have disadvantages not inherent in the Lowery structure.

SUMMARY OF THE INVENTION

The apparatus of this invention is primarily comprised of a trough, a float, a valve and a shiftable liquid weight member. The trough is generally circular in nature and is provided with a peripheral substantially narrow, annular, drinking trench and an interior substantially wide, annular float receptacle both of which are adapted to receive and retain water with the drinking trench receiving its water from the float receptacle. The float which is substantially annular or ring-like is buoyed in the float receptacle by means of the water and is provided with an upwardly extending float support. The float support in the are above the opening in the float receives and supports a threaded and vertically arranged adjusting bolt which in turn is threadably received by and supports a valve depressor cap. The float itself in one embodiment is hollow and weighted with water or another liquid and in another embodiment the float supports a hollow, liquid filled weight member. The valve is axially aligned with respect to the bolt and valve depressor cap and includes a valve chamber residing above the trench and float receptacle, an inlet which connects the water source with the valve chamber, and a plunger. The plunger is provided with a valve seat and extends from the valve chamber through an opening so as to contact the valve depressor cap. The liquid or water weight cooperating with the valve depressor cap loads the plunger and tends to force the plunger downwardly and provide an opening for water to flow from the valve chamber to the float receptacle and then to the trench. Further, the valve depressor cap in conjunction with its mating portion of the valve chamber is designed so that upon any quick and substantial tilting of the trough such as is frequently caused by chickens perching on one side of the drinker, the water weight produces a sloshing effect and causes the valve depressor cap to become disengaged from the plunger while remaining in contact with other portions of the valve chamber to allow the plunger to shut off the flow of water from the valve.

The height of the drinking water in the trench may be lowered or raised by turning the adjusting bolt in the desired direction to create greater or less float movement required to effect seating of the valve from an open position.

It is contemplated and desirable that the trough, valve and float be at least partially enclosed by a cover. The cover may be secured to the trough so as to allow the trough to be supported above the floor or ground so that the composite drinker may be raised or lowered in relation to the floor in order to adjust the height of the drinking trench to the particular size chicken.

Therefore, an object of this invention is to provide an improved float operated valve means for automatically maintaining the proper level of water in a poultry drinker trench.

Another object of this invention is to provide a composite drinker which is easily dismantled so that worn parts may be replaced and so that the composite unit may be assembled in a minimum of time.

A further object of this invention is to provide a position sensitive valve which prevents water from overflowing the drinking trough when the unit is placed on an uneven surface and which is adapted to supply water to the drinking trench at various levels depending on the particular need.

A still further object of this invention is to provide a composite drinker with a position sensitive valve that is operable under water pressures ranging from a few feet of water such as might be obtained from a tank to a higher pressure such as the typical forty pounds per square inch pressure obtained in pressure water systems.

Still another object of this invention is to provide a drinker with a liquid weight which is adapted to shift and produce a sloshing effect in its receptacle to aid the valve depressor cap in disengaging the plunger upon a substantial tilting of the receptacle.

Yet another object of this invention is to provide a drinker for poultry which maintains a sanitary environment by preventing spillage and which is provided with a one-way gasket valve to prevent water in the drinking trench from re-entering the water reservoir.

These and other objects of this invention will become apparent when the following claims and detailed description are read in conjunction with the appended drawings, and which:

DESCRIPTION OF THE DRAWINGS

FIGURE 1 is a pictorial view of the first embodiment of the composite drinker showing the same resting on the floor of a chicken house or the like;

FIGURE 2 is a pictorial view of the second embodiment of the composite drinker showing the same resting on the floor of a chicken house or the like;

FIGURE 3 is a section view taken along lines 3—3 of FIGURE 1 showing for the first embodiment the various elements of the valve mechanism, the water weight, the float mechanism and the trough in a normal, level position and with the valve open;

FIGURE 4 is a section view taken along line 4—4 of FIGURE 2 showing for the second embodiment the various elements of the valve mechanism, the water weighted float mechanism and the trough in a normal, level position and with the valve open;

FIGURE 7 is a pictorial view of the first embodiment with the cover removed and showing the water weight resting on the valve mechanism;

FIGURE 8 is a pictorial view of the second embodiment with the cover removed and showing the water weighted float in contact with the valve mechanism;

FIGURE 13 is an enlarged fragmentary section view showing the one-way gasket valve;

DETAILED DESCRIPTION OF THE PREFERRED EMBODIMENTS

Figure 6:
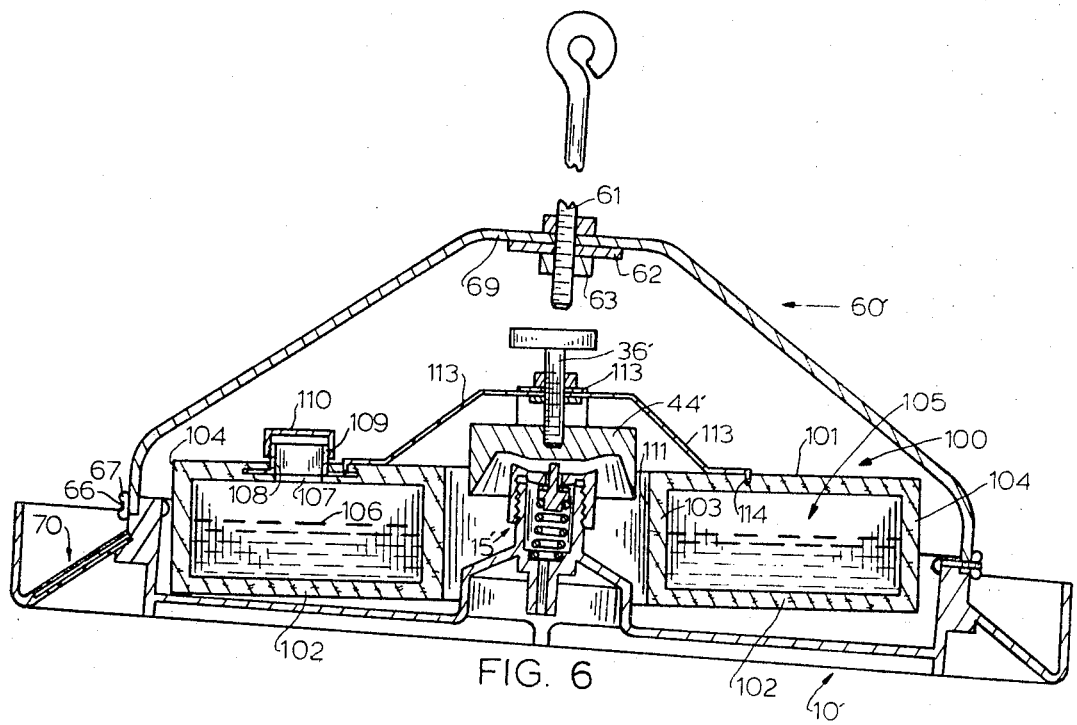
FIGURE 6 is the section of FIGURE 4 and like FIGURE 5 showing for the second embodiment the drinker supported from above and the valve closed in a tilted position of the drinker such as caused when a chicken perches on the drinker.
Figure 5:
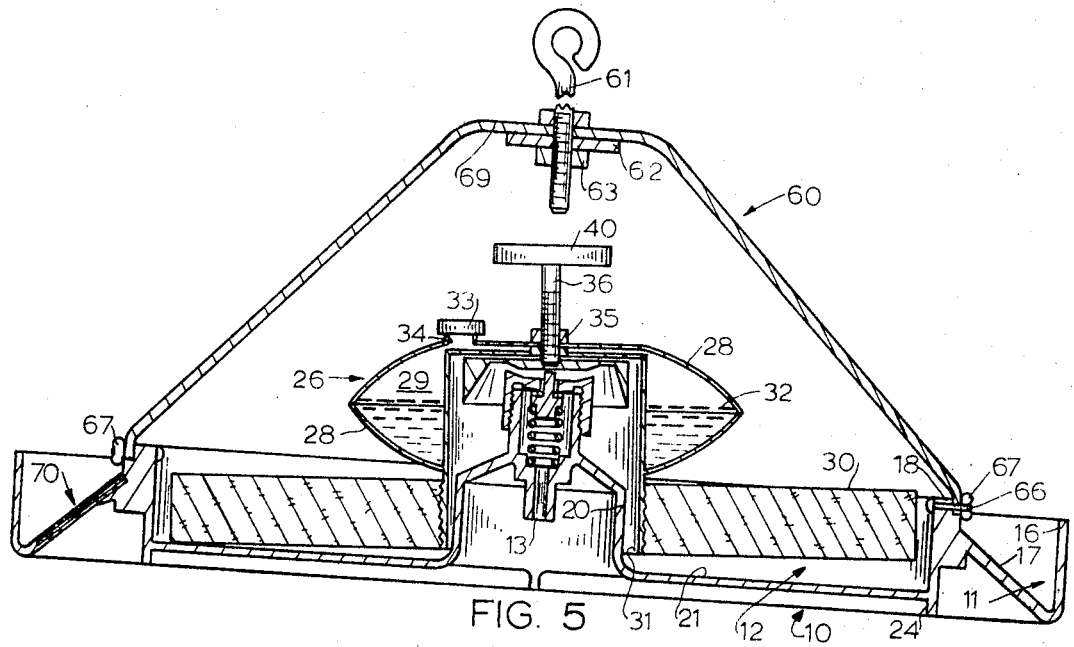
FIGURE 5 is the section of FIGURE 3 showing for the first embodiment the drinker supported from above and the valve closed in a tilted position of the drinker such as caused when a chicken perches on the drinker.
Figure 9:
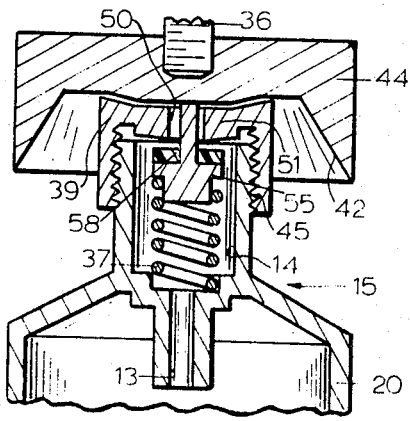
FIGURE 9 is an enlarged fragmentary section of the valve mechanism used in all embodiments and showing it in an open position.
Figure 10:
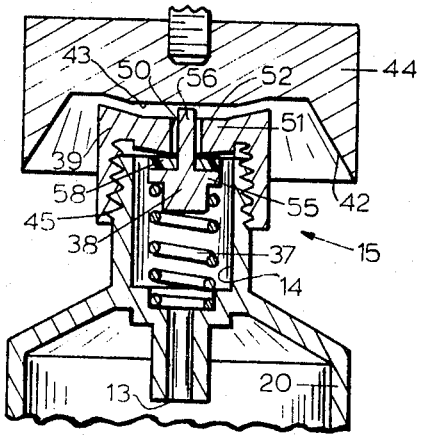
FIGURE 10 is an enlarged fragmentary section view of the valve mechanism showing it in a closed position.
Figure 15:
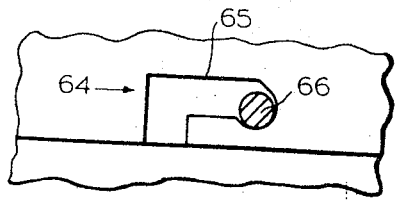
FIGURE 15 is an enlarged fragmentary view showing the releasable attachment for securing the cover to the trough.
Figure 12:
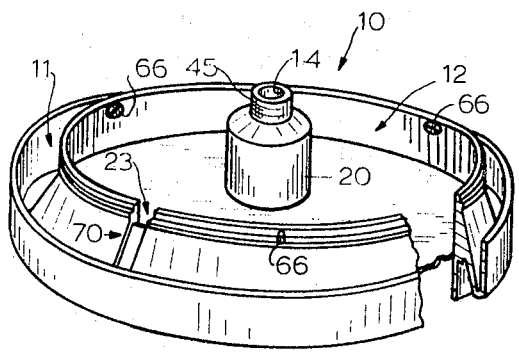
FIGURE 12 is a pictorial view of the trough structure which is common to all embodiments and showing the passageways for channeling the water from the float receptacle into the drinking trench.
Figure 16:
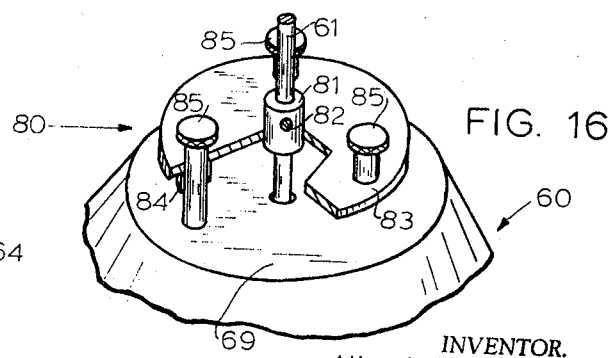
FIGURE 16 is a fragmentary pictorial view of the leveling apparatus which may apply to either embodiment when the drinker is suspended from the ceiling.
Figure 14:
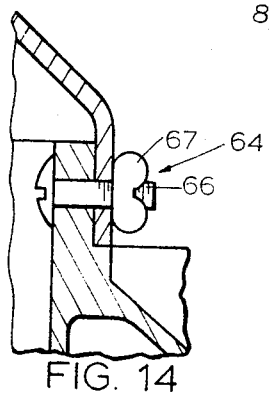
FIGURE 14 is an enlarged fragmentary section view showing the releasable attachment for clamping the top cover to the trough.

In the first embodiment, trough 10 is substantially circular in nature and includes a substantially narrow, annular drinking trench 11, a substantially wide, annular float receptacle 12, a water inlet 13 and a valve 15 including a valve chamber 14. (FIGURES 9, 12.) Drinking trench 11 is formed by annular vertical wall 16, sloping wall 17 and connecting wall 18. Float receptacle 12 is comprised of inner vertical wall 20, bottom wall 21 and connecting wall 18 thus making it integral with drinking trench 11. Drinking trench 11 and float receptacle 12 are connected by passageways 23 so that the same level of water which resides in float receptacle 12 will also reside in drinking trench 11. When the composite drinker resides on a floor or ground surface, it is supported by drinking trench 11 at the intersection of vertical wall 16 and sloping wall 17 and by extension 24 of connecting wall 18. (FIGURE 3.)

Float 30, which is essentially annular or doughnut shaped and which is provided with an opening 31, is made from some lighter-than-water object, such as foamed polystyrene, wood or the like. Float 30 is buoyed in float receptacle 12 by the water received therein. Float 30 includes a weight portion 26 which is axially aligned with and resides over opening 31. Weight portion 26 includes an inner cylindrical wall 27 which is joined to and extends upwardly from float 30 and an outer elliptical wall 28 which in combination with wall 27 forms a water cavity 29 which is adapted to receive and retain water 32 at a desired level necessary to produce the required valve loading. The referred to water 32 produces both the desired weight needed to load the valve an also when shifted during sudden tilting of the drinker produces the desired sloshing effect which has been found to facilitate positive and rapid valve response to tilting. Elliptical wall 28 is provided with a threadably mounted filler cap 33 in opening 34 through which water 32 enters cavity 29. Weight portion 26 further includes a threaded collar 35 which is axially aligned with opening 31 in float 30.

Figure 11:
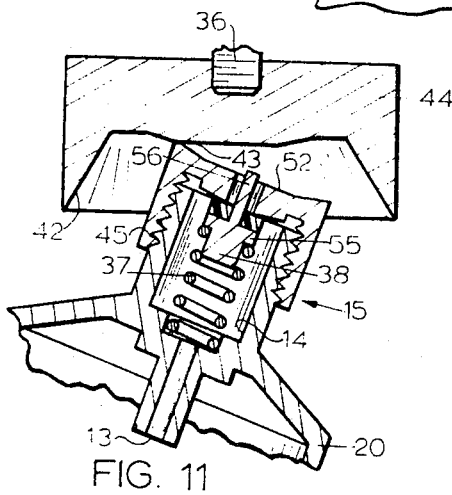
FIGURE 11 is an enlarged fragmentary section view of the valve mechanism showing the same in a closed position and tilted to an angle of about 20 degrees with respect to the weight and float arrangement.

The composite valve structure 15 includes adjusting bolt 36, valve chamber 14, spring 37, plunger 38 and chamber cap 39. (FIGURE 9.) Adjusting bolt 36, which has a knurled head 40 to facilitate the turning thereof, is threadably received by threaded collar 35 as it extends downardly and is rigidly secured to valve depressor cap 44. As shown in FIGURE 3, adjusting bolt 36 is threadably received by valve depressor cap 44; however, adjusting bolt 36 is tightened therein so that upon the turning of bolt 36, valve depressor cap 44 turns therewith. Valve depressor cap 44 is circular in nature and is provided with an inverted frusto-conical cavity 42 which forms a raised, flat interior surface 43. Valve chamber 14 is cylinder-like in shape having a smooth inner surface which receives pressurized water from water inlet 13 and a threaded outer surface 45 which threadably receives chamber cap 39. Chamber cap 39 has a circular opening 50 in top wall 51. Top wall 51 is provided with a depression 52 which is adapted to mate with interior surface 43 of valve depressor cap 44. Plunger 38 includes a body portion 55 and an integral shaft 56 which has a diameter slightly smaller than the diameter of opening 50 of chamber cap 39. Shaft 56 is adapted to receive a washer-like seat 58 which aids in the shutting off of the water through opening 50 when plunger 38 is in a closed position. It is to be noted that the portion of shaft 56 which slidably resides in opening 50 is made slightly longer, about 3/64″ being preferred, then the length of opening 50 so that upon the downward movement of valve depressor cap 44, raised surface 43 of valve depressor cap 44 engages shaft 56 and pushes plunger 38 downwardly against spring 37 so as to provide an outlet for the water residing in valve chamber 14. Thus, with reference to FIGURE 11, a substantial tilting of trough 10 relative float 30 to an angle, for example, of 20 degrees allows raised surface 43 to slip out of contact with plunger 38 to allow it to seal opening 50 thus preventing the further flow of water from valve 15 into float receptacle 12. In such movement any adverse tendency of surface tension or minor dirt particles on the contacting surfaces is counteracted by the liquid sloshing effect of the water or other liquid providing the valve loading weight whether in the float itself or the supported hollow weight member illustrated in the two embodiments.

A conical shaped cover 60 is provided for the composite drinker and is adapted to be attached to connecting walls 18 so as to shield the water in float receptacle 12, the float 30, and other interior apparatus from being contaminated by the chickens thus facilitating the cleaning of the entire apparatus. Where the composite drinker is suspended from the ceiling or the like, a rigid connecting rod 61 extends axially through cover 60 to receive bearing plate 62 and nut 63 which supports bearing plate 62 thereon. The other end of the connecting rod 61 may be provided with an eyelet which may engage suspension hooks (not shown). Cover 60 which has an upper flat surface 69 is releasably attached to trough 10 for quick and easy removal for cleaning and supports trough 10 when the unit is suspended from some overhead member. The releasable attachments 64 which are spaced around the periphery of trough 10 and cover 60 are comprised of a threaded shaft 66 which is secured to and extends radially outward from connecting wall 18, a locking slot 65 located in cover 60 and adapted to receive threaded shaft 66 and a wing nut 67 threadably mounted on shaft 66. Upon securing trough 10 to cover 60, threaded shafts 66 are inserted in locking slots 65 and wing nuts 67 are tightened so that the overlapping cover 60 is rigidly held against connecting wall 18.

In order to prevent feed particles and other debris which fall from the chickens into drinking trench 11 from entering and contaminating the water in float receptacle 12, passageway 23 which directs water from float receptacle 12 into drinking trench 11 is provided with a one-way gasket valve 70. Gasket valve 70 includes a pair of parallel walls 71 and 72 which are spaced apart by intermediate wall 73. Walls 72 and 71 are contiguous respectively with float receptacle 12 and drinking trench 11. A resilient, flexible membrane 74, such as polyethylene film, is placed on top of wall 72 and between wall 72 and intermediate wall 73. Walls 71 and 72 respectively have openings 75 and 76 through which water passes in flowing from float receptacle 12 into drinking trench 11. Flexible membrane 74 normally rests against wall 72 and seals opening 76; however, when the water level in float receptacle 12 is higher than the water level in drinking trench 11, flexible membrane 74 is forced outwardly and away from wall 72 to allow the water to flow around flexible membrane 74, through opening 75 and into drinking trench 11. Upon the equalization of the water levels in drinking trench 11 and float receptacle 12, flexible membrane 74 once again lies flat against wall 72 and prevents any solid particles or the like from entering float receptacle 12.

Where the apparatus is to be suspended from the ceiling or other overhead member by a rigid rod 61, trough 10 must be substantially level or the water in float receptacle 12 and drinking trench 11 will shift to the lower listing area spilling over the same and preventing the chickens from drinking out of the upwardly tilting portions. To properly balance trough 10, leveler 80 is provided with a collar 81 which is slidably mounted on rod 61 and has a set screw 82 which, when properly positioned, secures collar 81 to rod 61. Collar 81 is integrally connected to a leveling plate 83 which resides in a horizontal plane being perpendicular to the axis of rod 61 and is substantially parallel with upper flat surface 69 of cover 60. Leveling plate 83 has a plurality of vertically extending threaded and cylindrical openings 84 each of which are adapted to receive a thumb screw 85. It is contemplated that only three leveling screws are required. To level trough 10, thumb screws 85 are threadably inserted in threaded openings 84 and set screw 82 is tightened against connecting rod 61. Since cover 60 is not rigidly connected to rod 61, the downward movement of thumb screw 85 which engages the upwardly tilted portion of flat surface 69 causes cover 60 to pivot in that direction and upon the leveling of the water in trough 10, the remainder of thumb screws 85 are screwed downwardly to impinge against flat surface 69 to hold cover 60 and trough 10 in that level position.

In reference to FIGURES 2, 4, 6, and 8 which illustrates the second embodiment of this invention, trough 10′, valve 15′, cover 60′, one-way gasket 70′ and related components are substantially identical to trough 10, valve 15, cover 60 and one-way gasket valve 70 and related components of the first embodiment.

Float 100 is hollow and may be made from foamed polyethylene or the like and is annular in shape and includes disc shaped and parallel walls 101 and 102 and concentrically arranged cylindrical walls 103 and 104 which are effectively joined to form an annular water cavity 105 and float opening 111. Float opening 111 adapts float 100 to be axially aligned with and surround valve 15′. Water or other liquid 106 which is to be employed for valve weighting and for producing the desired sloshing effect enters cavity 105 through opening 107 in wall 101. Water 106 is brought to the level required to produce the desired amount of weight. Opening 107 is provided with a collar 108 having a threaded upper end 109 and a cap 110 which is adapted to be screwed on threaded end 109.

Float 100 is provided with a plurality of upwardly extending and intersecting cap depressor supports 113 which are suitably secured by prongs 114 or the like to float 100 and extend from one side of float 100 diametrically across opening 111 to the other side of float 100. Cap depressor supports 113 are provided with at their upper intersections a collar 114 which extends vertically above and below the plane of intersection. Collar 114 is internally threaded and receives adjusting bolt 36′. Adjusting bolt 36′ is rigidly secured to valve depressor cap 44′.

In operation of the first embodiment float receptacle 12 is initially empty of water thus allowing valve depressor cap 44 to push shaft 56 of plunger 38 downwardly against the upward force exerted thereon by spring 37 so that seal 58 becomes disengaged from the contiguous surface of valve cap 39. The downward force is assisted by the required weight of water 32 in the water weight portion 26 such water for weight purposes being poured into the weight portion 26 prior to operation. Adjusting bolt 36 is then screwed either into or out of threaded collar 35 so as to adjust float 30 to allow the desired level of water to be received by the drinking trench 11. Connecting rod 61 is inserted through the opening in cover 60 and then receives bearing plate 62 and nut 63 is that order. Cover 60 is connected to trough 10 by means of locking slots 65. If the composite drinker is to be suspended from the ceiling, leveler 80 is adjusted so that the water in trough 10 is evenly distributed over its entire floor surface.

Upon allowing water to enter water inlet 13 from a source, water flows through valve chamber 14, through opening 50 in valve cover 39 and dribbles into float receptacle 12. The water is maintained at a level in the drinking trench 11 which is substantially equal to the level in float receptacle 12 by passing from float receptacle 12 through passageways 23 including one-way gasket valve 70 into drinking trench 11. As the level of the water in trough 10 becomes sufficient to buoy float 30 (or in the case of the second embodiment, float 100) float 30 rises and lifts water depressor cap 44 out of contact with valve cap 39 whereupon spring 37 forces plunger 56 upwardly to bring valve seal 58 in contact with the interior wall of valve cap 39 so as to stop the flow of water through opening 50. As the water is consumed by the fowl from drinking trench 11, float 30 is lowered and valve depressor cap 44 contacts plunger 56 and forces it downwardly against spring 37 whereby water is once again allowed to enter drinking trench 11 in the manner just described.

Anytime a chicken perches on the composite drinker, the drinker is tilted and the level of water in one side of drinking trench 11 and the adjacent portion of float receptacle 12 becomes greater than the level diametrically opposite therefrom. Also, as water 32 in water weight portion 26 initially shifts and sloshes, float 30 is aided in its lateral movement relative float receptacle 11 to cause valve depressor cap 44 to come out of contact with plunger 56. Since float 30 resides on the water in float receptacle 12, shifting of water level causes float 30 and the supporting structure to assume a new position relative the central axis of the drinker and valve depressor cap 44 to be shifted with the help of water 32 in water weight portion 26 and disengaged from the top wall surface of cap 39. It has been found that the momentum of water 32 rushing toward a new level position produces a sloshing effect which aids in the movement of valve depressor cap 44 relative to valve 15. That is, such sloshing effect produces a more rapid and positive valve response to valve tilting. Since shaft 56 is slightly longer than the cylindrical length of opening 50, the tilting of water weight portion 26 relative valve cap 39 causes plunger 56 to assume its normal closed position and valve seat 58 to reside against the inner wall surface of valve cap 39. Therefore, any substantial tilting of trough 10 will close opening 50 and shut off the supply of water to float receptacle 12. Thus, whether the drinker is suspended or supported, it will if tilted as by a chicken if suspended, or by being placed on an uneven surface, if supported, will automatically shut itself off.

So far as the second embodiment is concerned it will be understood that the operation is normally the same as that just explained. However, the water weight and sloshing effect for the second embodiment is provided by such required amount of water 106 as is installed in the hollow float 100. Thus tilting of the second embodiment utilizes sloshing water in the float itself for assistance in valve operation. Also with reference to the second embodiment it will be noted that the second embodiment allows the overall height of the valve structure as well as the overall height of the drinker to be substantially reduced.

While particular embodiments of the invention are illustrated and described, various modifications may obviously be made without departing from the scope and spirit of the invention which is therefore intended to be defined in the appended claims. For example, other forms of loosely mounted and laterally shiftable floats may be employed. Also, other means may be employed to provide the desired loosely engaging and shiftable bearing surface for opening and closing the valve pin in level and tilt conditions all without departing from the spirit and scope of the claims.

What is claimed is:

1. A poultry drinker capable, when in a normal level position, of automatically maintaining a predetermined depth of drinking water and when tilted of shutting off the water supply, comprising:
    (a) a pan shaped container having sides and bottom walls defining an exterior drinking trench and an interior water reservoir and including a connecting passageway for maintaining water at the same level in each;
    (b) a valve centrally located in said bottom wall and connected to a water source, said valve including a vertically positionable plunger means having an exposed upper end and which when moved downwardly opens said valve to allow water to enter the reservoir and when moved upwardly closes said valve;
    (c) a buoyant float structure loosely surrounding said valve and floating in said reservoir;
    (d) valve opening means supported by said float structure above said valve and including a bearing member in loose engagement with said plunger means, said bearing member engaging and depressing said plunger means and opening said valve upon said water being depleted in said reservoir and being removed from active engagement with said plunger when said reservoir is refilled to said predetermined level; and
    (e) an enclosed shiftable liquid weight means carried by said float structure whereby upon said reservoir being tilted, said liquid weight means is adapted to slosh in the direction of the downward tilt in its enclosure to aid said float structure and said bearing member in moving laterally relative said plunger means a distance difficient to break the engagement between said bearing member and said plunger means to allow said plunger means to close said valve.

2. The drinker of claim 1 including adjusting means for adjusting the position of said bearing member with respect to said float structure whereby to adjust said predetermined depth of water in said receptacle.

3. The drinker of claim 2 wherein said float structure comprises a uniform annular flotation member surrounding said valve and said valve includes spring means tending to normally move said plunger means upwardly to maintain said valve in a closed position.

4. The drinker of claim 3 wherein said enclosed shiftable liquid weight means is comprised of a hollow container supported by said flotation member and, forming a cavity adapted to be partially filled with said liquid weight means.

5. The drinker of claim 3 wherein said enclosed shiftable liquid weight means is comprised of said uniform annular flotation member forming an annular cavity, said cavity adapted to receive and be partially filled with said liquid weight means.

6. The drinker of claim 1 wherein said passageway between said drinking trench and said reservoir includes a one-way gasket valve for substantially preventing any return flow of water from said drinking trench to said water reservoir, said gasket valve being comprised of an inner wall adjacent said water reservoir, an outer wall adjacent said drinking trench and spaced a distance outwardly from said inner wall, said inner and outer walls having opposed openings located in the bottom portions thereof and a flexible member residing in said space between said inner and outer walls and on said inner wall, said flexible member normally covering said inner wall opening and adapted to move outwardly and away from said inner wall opening upon the level of water in said water reservoir being greater than the level of water in said drinking trench to allow water to flow from said water reservoir through said gasket valve and into said drinking trench.

7. An automatic poultry drinker for presenting a predetermined level of water to the watering fowl comprising:
    (a) a composite receptacle having a bottom wall, a peripheral side wall integrally connected to and extending upwardly from said bottom wall and an interior connecting wall supported by and extending upwardly from said bottom wall, said connecting wall and said side wall forming a drinking trench and said connecting wall and said bottom wall forming an interior water reservoir, said connecting wall including passageways for maintaining water at equal levels in said drinking trench and said water reservoir;

(b) a conical-shaped cover member having a base removably secured to said connecting wall to enclose said water reservoir;

(c) a valve centrally mounted on said bottom wall and connected to a water source, said valve forming a chamber and a vertically aligned valve opening in communication with said chamber, a plunger residing in said chamber and having a body portion normally sealing said valve opening and a shaft connected to said body portion and slidably residing in and extending through said valve opening, said shaft adapted when forced downwardly to break said seal between said body portion and said valve opening and spring means located in said valve chamber and adapted to normally maintain said seal between said valve opening and said plunger body portion;

(d) an annular float supported by the water in said water reservoir and having a concentrically located opening, said float surrounding said valve and being in axial alignment therewith;

(e) a shiftable liquid weight comprising a hollow container supported by and above and forming a cavity adapted to be partially filled with said liquid to provide said weight;

(f) an adjusting bolt vertically and threadably mounted in said container and vertically above and in axial alignment with said plunger shaft; and (g) a valve depressor cap rigidly secured to said adjusting bolt and in loose engagement with said plunger shaft, said valve depressor cap engaging and depressing said plunger shaft upon the water in said reservoir dropping below said predetermined level to open said valve and refill said reservoir.

8. An automatic poultry drinker for presenting a predetermined level of water to the watering fowl comprising:

(a) a composite receptacle having a bottom wall, a peripheral side wall integrally connected to and extending upwardly from said bottom wall and an interior connecting wall supported by and extending upwardly from said bottom wall, said connecting wall and said side wall forming a drinking trench and said connecting wall and said bottom wall forming an interior water reservoir, said connecting wall including passageways for maintaining water at equal levels in said drinking trench and said water reservoir;

(b) a conical-shaped cover member having a base removably secured to said connecting wall to enclose said water reservoir;

(c) a valve centrally mounted on said bottom wall and connected to a water source, said valve forming a chamber and a vertically aligned valve opening in communication with said chamber, a plunger residing in said chamber and having a body portion normally sealing said valve opening and a shaft connected to said body portion and slidably residing in and extending through said valve opening, said shaft adapted when forced downwardly to break said seal between said body portion and said valve opening and spring means located in said valve chamber and adapted to normally maintain said seal between said valve opening and said plunger body portion;

(d) an annular float axially aligned with said valve and supported by the water in said water reservoir, said float including an annular cavity partially filled with a liquid such as water to provide a shiftable liquid weight;

(e) float support means connected to said float and extending upwardly and over said valve and providing a threaded mounting hole thereabove;

(f) an adjusting bolt vertically and threadably mounted for rotation in said hole and being vertically above and in axial alignment with said plunger shaft; and (g) a valve depressor cap rigidly secured to said adjusting bolt and in loose engagement with said plunger shaft, said valve depressor cap engaging and depressing said plunger shaft upon the water in said reservoir dropping below said predetermined level to open said valve and refill said reservoir.

9. The drinker of claim 8 wherein said passageway between said drinking trench and said reservoir includes a one-way gasket valve for substantially preventing any return flow of water from said drinking trench to said water reservoir, said gasket valve being comprised of an inner wall adjacent said water reservoir, an outer wall adjacent said drinking trench and spaced a distance outwardly from said inner wall, said inner and outer walls having opposed openings located in the bottom portions thereof and a flexible member residing in said space between said inner and outer walls and on said inner wall, said flexible member normally covering said inner wall opening and adapted to move outwardly and away from said inner wall opening upon the level of water in said water reservoir being greater than the level of water in said drinking trench to allow water to flow from said water reservoir through said gasket valve and into said drinking trench.

10. The drinker of claim 8 wherein said conical-shaped cover is adapted to support said drinker from an overhead and downwardly extending rigid rod, said cover having a flat and horizontal surface forming its upper end surface and having an opening in said flat surface being concentrically aligned with said conical-shaped cover, said rigid rod extending through said opening, a bearing plate secured to said rigid rod and bearing against the underside of said flat surface to support said drinker, and leveling means connected to said rigid rod and in contact with the upper side of said flat surface, said leveling means being comprised of at at least three leveling screws and cylinders, said cylinders positioned radially outwardly from and secured to said rigid rod and being arranged parallel to and equidistantly about said rigid rod to receive said leveling screws whereby said leveling screws engage said cover flat surface and by the selective turning of each, said cover and drinker are made plumb.

References Cited

UNITED STATES PATENTS

| | | | |
|---|---|---|---|
| 2,628,631 | 2/1953 | Boyd | 137—430 |
| 2,821,167 | 1/1958 | Gilbertson | 119—80 X |
| 3,079,892 | 3/1963 | Lowery | 119—79 |
| 3,286,724 | 11/1966 | Sawyer | 137—426 |

ALDRICH F. MEDBERY, *Primary Examiner.*

U.S. Cl. X.R.

137—430

UNITED STATES PATENT OFFICE
CERTIFICATE OF CORRECTION

Patent No. 3,450,103                                                  June 17, 1969

Albert W. Davis

It is certified that error appears in the above identified patent and that said Letters Patent are hereby corrected as shown below:

Column 9, line 31, after "above" insert -- said float --.

Signed and sealed this 24th day of November 1970.

(SEAL)
Attest:

Edward M. Fletcher, Jr.                              WILLIAM E. SCHUYLER, JR.
Attesting Officer                                               Commissioner of Patents